(12) United States Patent
Chen et al.

(10) Patent No.: US 9,317,097 B2
(45) Date of Patent: Apr. 19, 2016

(54) EFFICIENCY ADJUSTMENTS IN POWER SUPPLY SYSTEM

(71) Applicant: International Business Machines Corporation, Armonk, NY (US)

(72) Inventors: Jenseng Chen, New Taipei (TW); Jung-Tai Chen, Taipei (TW); Tzongli Lin, Taipei (TW); Yu-Chen Lin, New Taipei (TW); Bruce A. Smith, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/572,853

(22) Filed: Dec. 17, 2014

(65) Prior Publication Data

US 2015/0185802 A1 Jul. 2, 2015

Related U.S. Application Data

(63) Continuation of application No. 14/552,540, filed on Nov. 25, 2014.

(30) Foreign Application Priority Data

Dec. 31, 2013 (TW) .............................. 102149350 A

(51) Int. Cl.
*G06F 1/32* (2006.01)
*H02M 1/08* (2006.01)
(Continued)

(52) U.S. Cl.
CPC ............... *G06F 1/3203* (2013.01); *H02M 1/08* (2013.01); *H02M 1/32* (2013.01); *H02M 7/217* (2013.01); *H02M 2001/0019* (2013.01); *H02M 2001/0048* (2013.01)

(58) Field of Classification Search
CPC ........... H02M 7/00; H02M 7/02; H02M 7/21; H02M 7/217; Y02B 70/10; Y02B 70/00; Y02B 70/12; Y02B 70/14; Y02B 70/16; Y02B 70/30; Y02B 70/32; Y02B 70/3216; Y02B 70/126

USPC ........ 363/15, 34, 35, 65, 67, 69, 84, 125–127
See application file for complete search history.

(56) References Cited

U.S. PATENT DOCUMENTS 6,992,470 B1 1/2006 Chiu
7,019,995 B2 3/2006 Niemand et al.
(Continued)

FOREIGN PATENT DOCUMENTS

CN 2835954 Y 11/2006
CN 101354407 A 1/2009
(Continued)

OTHER PUBLICATIONS

TW Application No. 102149350, entitled "Efficiency Adjustments in Power Supply System", filed on Dec. 31, 2013.
(Continued)

*Primary Examiner* — Timothy J Dole
*Assistant Examiner* — Htet Z Kyaw
(74) *Attorney, Agent, or Firm* — Steven L. Bennett; Nolan M. Lawrence

(57) ABSTRACT

A power supply system for maintaining the efficiency of an AC/DC power conversion unit in relation to a load is disclosed. The load varies in response to power usage during operation of the power supply system. An AC power input and a DC power output of the power conversion unit direct DC power to attached components. A master controller disposed in the power supply system detects the load of an attached computer system through a DC meter and executes an algorithm to determine the values of circuit parameters of conversion circuits in the AC/DC power conversion unit. The master controller sends the values to a mode controller through a digital signal interface. The mode controller adjusts the operating mode of the conversion circuits and thus changes the efficiency of the AC/DC power conversion unit.

20 Claims, 2 Drawing Sheets

(51) Int. Cl.
*H02M 1/32* (2007.01)
*H02M 7/217* (2006.01)
*H02M 1/00* (2007.01)

(56) References Cited

U.S. PATENT DOCUMENTS

| | | | |
|---|---|---|---|
| 7,696,737 B2* | 4/2010 | Polivka | 323/284 |
| 7,898,235 B2 | 3/2011 | Seo | |
| 8,330,434 B2 | 12/2012 | Melanson | |
| 8,368,249 B2 | 2/2013 | Wu et al. | |
| 8,391,036 B2 | 3/2013 | Clemo et al. | |
| 8,405,373 B2 | 3/2013 | Tsai et al. | |
| 9,142,957 B2 | 9/2015 | Malmberg et al. | |
| 2007/0222463 A1* | 9/2007 | Qahouq et al. | 324/712 |
| 2008/0265683 A1* | 10/2008 | Zhu et al. | 307/80 |
| 2009/0198460 A1 | 8/2009 | Carroll et al. | |
| 2009/0296432 A1 | 12/2009 | Chapuis | |
| 2010/0332873 A1 | 12/2010 | Munjal et al. | |
| 2011/0157934 A1* | 6/2011 | Clemo et al. | 363/71 |
| 2012/0075901 A1 | 3/2012 | Ahangar et al. | |
| 2012/0117374 A1 | 5/2012 | Kwon et al. | |
| 2012/0151242 A1 | 6/2012 | McGrath et al. | |
| 2013/0163297 A1 | 6/2013 | Phadke et al. | |
| 2013/0176005 A1* | 7/2013 | Jin et al. | 323/234 |
| 2014/0183952 A1* | 7/2014 | Liu | 307/31 |
| 2014/0355715 A1 | 12/2014 | Hu | |

FOREIGN PATENT DOCUMENTS

| | | |
|---|---|---|
| JP | 2006060953 A | 3/2006 |
| JP | 5050558 B2 | 10/2012 |
| TW | 201000933 A | 1/2010 |
| TW | 201230633 A | 7/2012 |
| TW | M449728 U | 4/2013 |

OTHER PUBLICATIONS

Jenne, J., "Power Efficiency "How to" for the Dell PowerEdge Server Portfolio", Dell Enterprise Systems Engineering, Mar. 2012, Rev. 1.0, 19 pgs., © 2012 Dell Inc.

Peterchev, A., "Digital Pulse-Width Modulation Control in Power Electronic Circuits: Theory and Applications", Spring 2005, University of California, Berkeley, Copyright 2005 by Angel V. Peterchev.

Chen et al., "Efficiency Adjustments in Power Supply System," U.S. Appl. No. 14/552,540, filed Nov. 25, 2014.

IBM, "List of IBM Patents or Patent Applications Treated as Related."

* cited by examiner

EFFICIENCY ADJUSTMENTS IN POWER SUPPLY SYSTEM

This application is based on and claims the benefit of priority from Taiwan Patent Application 102149350, filed on Dec. 31, 2013.

BACKGROUND

The present invention relates generally to efficiency adjustments in power supply systems, and more particularly, to adjusting the efficiency of a power supply system according to a load.

A computer system is equipped with a power supply system for converting alternating current (AC) power into direct current (DC) power. In general, the power supply system is categorized according to the maximum output power. For details of the power supply system, refer to IBM System×550 W High Efficiency Platinum AC Power Supply or IBM System×750 W High Efficiency Platinum AC Power Supply.

In practice, the actual output power of the power supply system varies with a load. Moreover, the conversion efficiency of the power supply system varies with the load. In general, the distribution of the conversion efficiencies depends on the design of a conversion circuit in the power supply system. Hence, given the same load, efficiency still varies from conversion circuit to conversion circuit. For further details, refer to U.S. Pat. No. 8,391,036 filed by the applicant of this patent application.

Furthermore, U.S. Pat. No. 8,391,036 teaches maintaining the optimal efficiency regardless of variations in a load and, to this end, discloses a power supply system which includes multiple parallel conversion circuits. The power supply system is characterized in that each conversion circuit exhibits its respective efficiency; hence, the power supply system gives considerations to the present load and accordingly switches to any conversion circuit with preferred efficiency (that is, switches to the appropriate efficiency.) However, the power supply system must include multiple conversion circuits at the expense of production cost and to the detriment of space efficiency. Since the volume of a power supply system is governed by industrial standards, the number of conversion circuits contained in a power supply system is quite limited.

SUMMARY

Embodiments of the disclosure may include a power supply system, and a method for maintaining the efficiency of an AC/DC power conversion unit in the power supply system according to a load. The load varies in response to power usage during operation of the power supply system. AC power is received by an AC power input of the power supply system. One or more conversion circuits convert AC power received by the AC power input into DC power. A DC power output of the power supply system directs DC power to attached components. A master controller disposed in the power supply unit detects the load of an attached computer system by way of a DC meter and executes an algorithm to determine a set of circuit parameters of the conversion circuits in the AC/DC power conversion unit. The master controller sends the set of circuit parameters to a mode controller through a digital signal interface. The mode controller adjusts the operating mode of the conversion circuits according to the master controller and thus changes the efficiency of the power supply unit.

BRIEF DESCRIPTION OF THE SEVERAL VIEWS OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings.

DETAILED DESCRIPTION

Figure 1:
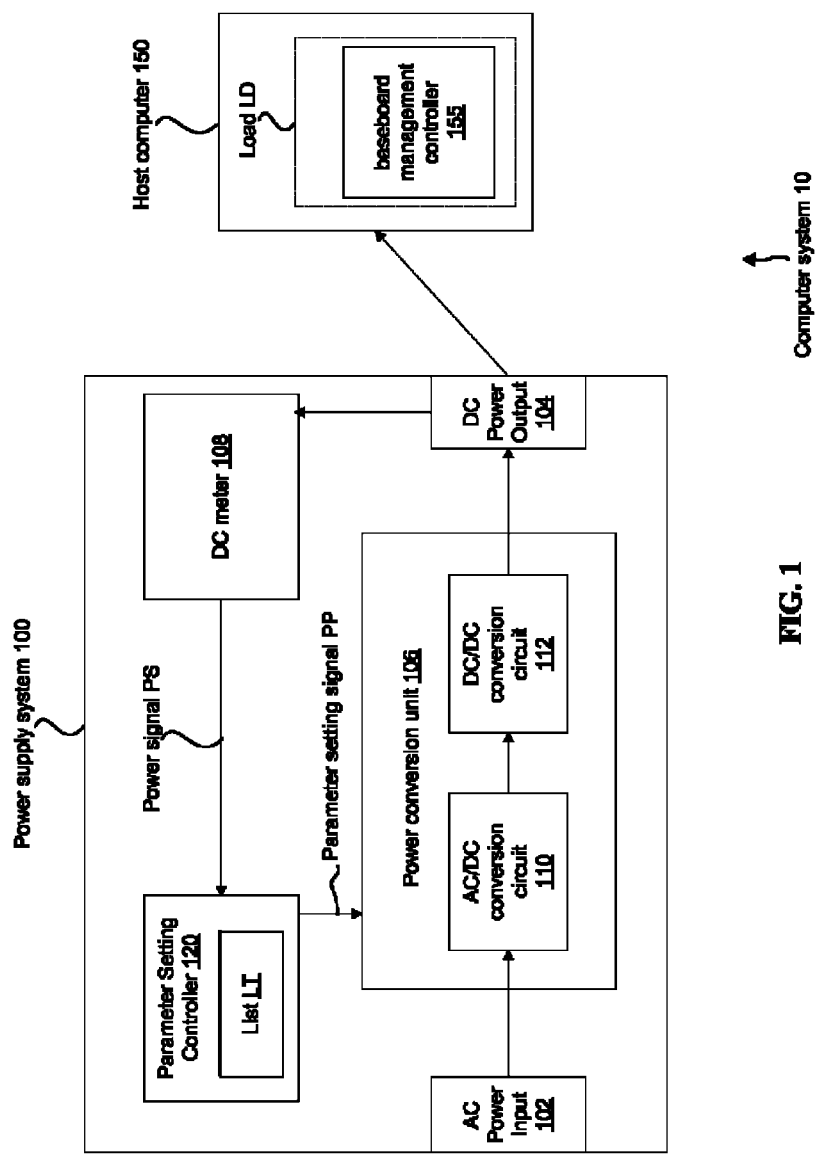
FIG. 1 is a schematic view of a computer system according to a specific embodiment of the present invention.

In an aspect, the present invention puts forth adjusting the efficiency of an AC/DC power supply unit in a power supply system according to a load. In particular, in an embodiment of the present invention, a digital controller or a micro chipset unit (MCU) is disposed in the power supply unit, a host computer, or a power distribution unit. The digital controller detects a present load of a computer system (for example, through a DC meter) and checks a list or executes an algorithm according to the present load so as to determine the "target values" of the parameters of conversion circuits in the power supply unit. Afterward, the digital controller sends the parameter target values to a controller of the conversion circuits through a digital signal interface. Hence, the controller of the conversion circuits adjusts the operating mode of the conversion circuits according to the parameter target values and thus changes the efficiency of the power supply unit, so as to reduce loss. The embodiment of the present invention dispenses with the conventional need to provide multiple parallel conversion circuits and thus circumvents the drawbacks thereof.

Moreover, in the embodiment of the present invention, light-load loss incurred by the power supply unit is reduced by adjusting the switch of switch components in the power supply unit (by Pulse Width Modulation (PWM), for example.) Unlike the prior art, the embodiment of the present invention not only reduces the required circuit area greatly, but also increases the flexibility of variations in the efficiency of a conventional power supply to thereby maintain the optimal efficiency within a large load variation range and reduce unnecessary energy loss.

Moreover, since the present invention is applicable to a wide range of variations in a load, the present invention further discloses a recovery mechanism, for example, a phase modulation circuit. Upon detection that the load undergoes abrupt changes in a short period of time, the phase modulation circuit starts the recovery mechanism whereby the conversion circuits provide an operating mode of the load in the shortest possible period of time and with the maximum phase number allowable by the conversion circuits so as to prevent the following phenomenon: if a high load suddenly crops up, the conversion circuits will instantaneously switch during the operating mode of the low load and thus cause overload. In particular, the phase modulation mechanism or another recovery mechanism is implemented by a hardware circuit to thereby ensure that its response duration is short enough, preferably, but not limited to, by nanosecond time scale.

In an embodiment, a power supply system comprises:
an AC power input;

a DC power output for outputting DC power to a load of the power supply system;

a power conversion unit for converting AC power from the AC power input to DC power output by the DC power output, the power conversion unit comprising a power conversion circuit and a first controller, the first controller adjusting an operating mode of the power conversion circuit according to a circuit parameter, in order to change an efficiency of the power conversion unit;

a DC meter for measuring the DC power output by the DC power output and sending a power signal indicative of the measured power; and a second controller for receiving the power signal from the DC meter and outputting a parameter setting signal to the first controller according to the measured power indicated by the power signal, wherein the first controller determines a value of the circuit parameter according to the parameter setting signal.

In another embodiment, a power supplying method applied to the power supply system, the method comprising the steps of:

measuring the DC output power by the DC meter and sending the power signal indicative of the measured power;

receiving the power signal, by the second controller from the DC meter, and outputting the parameter setting signal to the first controller according to the measured power indicated by the power signal;

determining, by the first controller, the value of the circuit parameter according to the parameter setting signal, and adjusting the operating mode of the power conversion circuit according to the determined value of the circuit parameter, in order to change an efficiency of the power conversion unit.

In yet another embodiment, power supplying method applied to the power supply system, the method comprising the steps of:

determining the time-variable rate of the power of the DC power output by the recovery circuit;

sending the recovery signal to the first controller by the recovery circuit if the time-variable rate exceeds the threshold value; and determining the value of the circuit parameter according to the recovery value by the first controller in response to the recovery signal, and adjusting the operating mode of the power conversion circuit according to the determined value of the circuit parameter, in order to change an efficiency of the power conversion unit.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings.

As will be appreciated by one skilled in the art, the present invention may be embodied as a system/device, a method or a computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
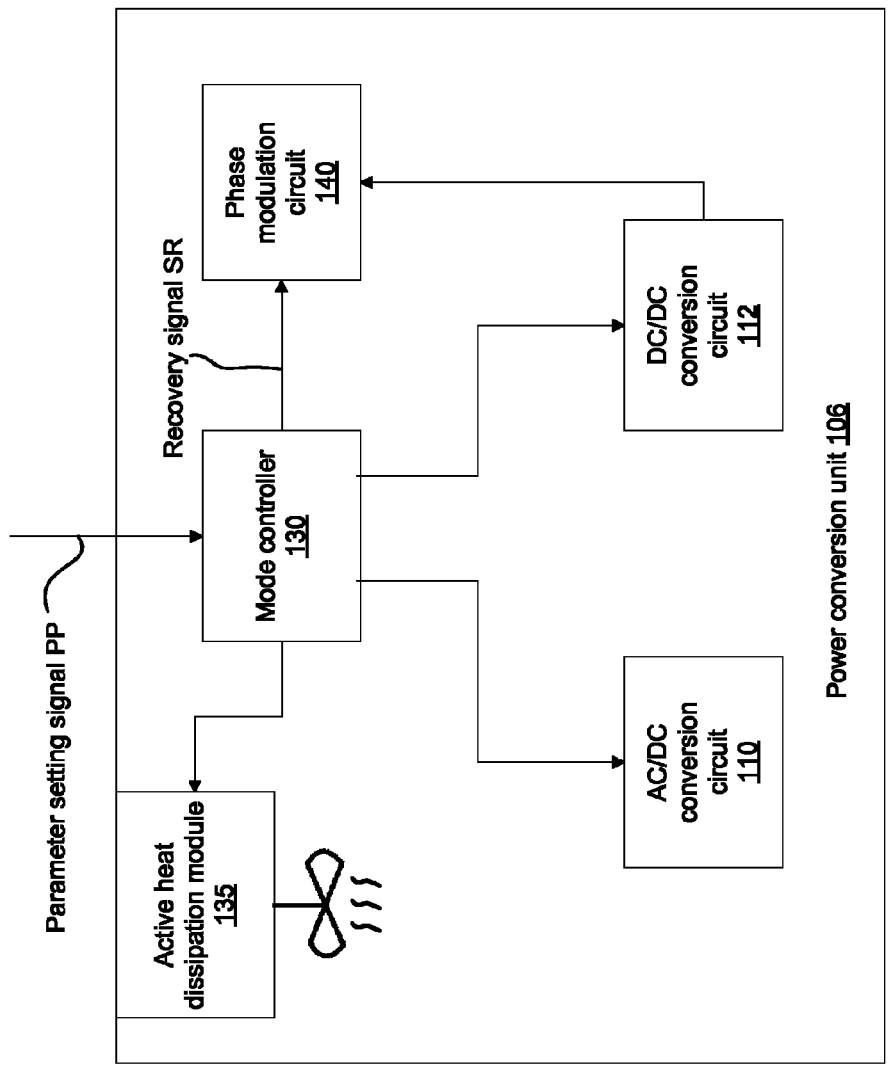
FIG. 2 is a schematic view of a power conversion unit according to a specific embodiment of the present invention.

Referring now to FIG. 1 through FIG. 2, systems/devices, methods, and computer program products are illustrated as structural or functional block diagrams or process flowcharts according to various embodiments of the present invention. The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

System Framework

Referring to FIG. 1, there is shown a schematic view of a computer system 10 according to a specific embodiment of the present invention. The computer system 10 comprises a power supply system 100 and a host computer 150. Depending on the task it is executing, the host computer 150 presents a load LD to the power supply system 100. The power supply system 100 converts AC power into DC power, such that DC power is supplied to the host computer 150. For the details of the power supply system 100, refer to the aforesaid IBM System×750 W High Efficiency Platinum AC Power Supply. Further details and the differences between the present invention and the prior art are described later.

Moreover, in this embodiment, the host computer 150 comprises a system management controller 155, such as a baseboard management controller (BMC), an Integrated Management Module (IMM). For the structure thereof and the roles it plays in a server (especially its ability to monitor the power consumption of the server), refer to IBM's Integrated Management Module for example. In another embodiment, the host computer 150 does not include any baseboard management controller. The functions of the baseboard management controller 155 in the embodiment of the present invention are described later.

Selectively, the host computer 150 is connected to the power supply system 100 through a power distribution unit (not shown). For further details of the power distribution unit, refer to IBM's power distribution unit product PDU+. In another embodiment (not shown), the power supply system 100 supplies power to multiple host computers 150.

For the other details of the computer system 10, refer to IBM's System X, Blade Center, or eServer, for example.

Power Supply System

Referring to FIG. 1, the power supply system 100 comprises an AC power input 102, a DC power output 104, and a power conversion unit 106.

Preferably, the power conversion unit 106 comprises an AC/DC conversion circuit 110 and a DC/DC conversion circuit 112. The AC/DC conversion circuit 110 converts AC power into DC power. The DC/DC conversion circuit 112 changes (regulates) the voltage of DC power generated from the AC/DC conversion circuit 110 and outputs DC power to the host computer 150 through the DC power output 104. Understandably, the DC/DC conversion circuit 112 will be dispensable, if the voltage of DC power generated from the AC/DC conversion circuit 110 is suitable for use by the host computer 150 or a power distribution unit (PDU, not shown) is disposed between the host computer 150 and the power supply system 100. For related details, refer to existing power supply systems.

Moreover, the power supply system 100 further comprises a DC meter 108 for measuring the output power of the DC power output 104. The DC meter 108 is provided in the form of a current meter. Since the output voltage of the DC power output 104 is known, it is practicable to measure the output power and thus send a power signal PS indicative of the measured output power of the DC power output 104.

The power supply system 100 further comprises a parameter setting controller 120. The parameter setting controller 120 receives a power signal PS from the DC meter 108 and sends a parameter setting signal PP according to the output power (for example, 350 W, 550 W, or 700 W) indicated by the power signal PS. The parameter setting signal PP is for use in setting the parameters of the power conversion unit 106 (preferably the DC/DC conversion circuit 112.) In this embodiment, the parameter setting controller 120 is preferably a digital controller and has a non-volatile memory (not shown) for storing a list LT. The list LT enumerates output powers and their respective set parameter values. For example, given output power of 350 W or 500 W, its respective set parameter values are different. The computer system 10 sets and changes the set parameter values on the list LT. Hence, after receiving the power signal PS, the parameter setting controller 120 refers to the list LT and sends the parameter setting signal PP indicative of the respective set parameter values.

In yet another embodiment not shown, parameter setting controller 120 is disposed in the host computer 150, and the functions of the parameter setting controller 120 are performed through the baseboard management controller 155. In a further embodiment, the baseboard management controller 155 measures the power consumed by the host computer 150 and not necessarily through the DC meter 108. In a further embodiment not shown in the figures, the parameter setting controller 120 is disposed in a power distribution unit. Understandably, the aforesaid technical features are included in the present invention.

FIG. 2 shows the power conversion unit 106. In addition to the AC/DC conversion circuit 110 and the DC/DC conversion circuit 112, the power conversion unit 106 further comprises a mode controller 130 and a phase modulation circuit 140.

As shown in the diagram, the mode controller 130 is electrically connected to the aforesaid components of the power conversion unit 106. In particular, the mode controller 130 controls the operating mode of the AC/DC conversion circuit 110 and/or the DC/DC conversion circuit 112. The efficiency manifested by the power conversion unit 106 varies with the operating mode of the AC/DC conversion circuit 110 and/or the DC/DC conversion circuit 112. The operating mode of the AC/DC conversion circuit 110 and/or the DC/DC conversion circuit 112 can be changed by means of the circuit parameters (but the present invention is not limited thereto) as follows:

(1) the switch frequency of the power component of the power controller;

(2) the gate driving voltage of the power control MOSFET;

(3) the phase number of the power control module; and (4) the discontinuous current mode (DCM) or continuous current mode (CCM) of the power control module.

The aforesaid circuit parameters determine the efficiency manifested by the conversion circuits—a technical feature which is well known to persons skilled in the art and thus is not described herein for the sake of brevity.

In another embodiment, the power conversion unit 106 further comprises an active heat dissipation module 135 provided in the form of a cooling fan, for example. The mode controller 130 is connected to an active heat dissipation module 135 and controls its operation, for example, slowing down the rotation of the cooling fan in response to a low load. The more power (wattage) the active heat dissipation module 135 consumes (for example, because the cooling fan is rotating faster), the more power is supplied to the computer system 10, and thus the lower is the efficiency (i.e., efficiency ratio of output wattage to input wattage) of the power conversion unit 106. Hence, by controlling the operation of the active heat dissipation module 135, the mode controller 130 can change the efficiency manifested by the power conversion unit 106. Take a PWM fan as an example, the mode controller 130 changes the circuit parameter of the operating mode of the active heat dissipation module 135 to pulse modulation width.

Referring to FIG. 1, the list LT enumerates given output powers and their respective set parameter values. For example, if the output power indicated by the power signal PS is 500 W, the parameter setting controller 120 searches the list LT for values of circuit parameters corresponding to power 500 W and sends the parameter setting signal PP indicative of the found parameter values. Then, the mode controller 130 receives the parameter setting signal PP and configures the AC/DC conversion circuit 110 and/or the DC/DC conversion circuit 112 or even the operating mode of the active heat dissipation module 135 according to the parameter value (corresponding to power 500 W) indicated by the parameter setting signal PP. Hence, the power conversion unit 106 manifests an efficiency corresponding to the output power of 500 W.

If the load changes subsequently, for example, when the output power indicated by the power signal PS changes to 350 W (or 700 W), the parameter setting controller 120 searches the list LT for values of circuit parameters corresponding to power 350 W (or 700 W) and sends the parameter setting signal PP indicative of the found parameter values. Then, the mode controller 130 receives the parameter setting signal PP and configures the AC/DC conversion circuit 110 and/or the DC/DC conversion circuit 112 or even the operating mode of the active heat dissipation module 135 according to the parameter value (corresponding to power 350 W (or 700 W)) indicated by the parameter setting signal PP. Hence, the power conversion unit 106 manifests an efficiency corresponding to the output power of 350 W (or 700 W) and thus has a distribution different from that of the efficiency corresponding to the output power of 500 W. The aforesaid parameters are illustrative rather than restrictive of the present invention, and thus the present invention can be exemplified by less or more parameters as needed.

In another embodiment, the mode controller 130 comprises a non-volatile memory (not shown) for restoring factory defaults corresponding to the aforesaid circuit parameters and configures the operating mode of the AC/DC conversion circuit 110, the DC/DC conversion circuit 112, and the active heat dissipation module 135 according to the factory defaults. Preferably, the purpose of the efficiency manifested by the operating mode configured according to the factory defaults is to effectuate the optimal conversion efficiency in the presence of the rated maximum load of the power supply system 100 (750 W for IBM System×750 W High Efficiency Platinum AC Power Supply, for example). As soon as the DC meter 108 detects that the load is less than the rated maximum load, the parameter setting controller 120 provides the parameter value corresponding to the present load (350 W, for example) to the mode controller 130, and then the mode controller 130 adjusts the operating mode of the AC/DC conversion circuit 110, the DC/DC conversion circuit 112, and the active heat dissipation module 135, so as to change the efficiency of the power conversion unit 106 and thus effectuate the optimal efficiency even in the presence of a load of 350 W.

In the aforesaid embodiments, the parameter setting controller 120 and the mode controller 130 are provided in the form of digital controllers which communicate with each other by a digital signal protocol and send the parameter setting signal PP. Preferably, the parameter setting controller 120 sends the parameter setting signal PP to the mode controller 130 by a Power Management Bus (PMBus) protocol.

Phase Modulation Circuit

By the aforesaid mechanism, the power conversion unit 106 allows the operating mode of the circuits to vary with a load and thus changes the efficiency manifested. Referring to FIG. 1, the aforesaid embodiments are characterized in that the parameter setting controller 120 not only reads the power signal PS to thereby measure the power of the present load, but also searches a list or performs another algorithm mechanism to infer an appropriate parameter value, and the whole process (i.e., the response duration) takes milliseconds. Hence, the adjustment mechanism of the parameter setting controller 120 is seldom quick enough to respond to an abrupt increase in a load.

Referring to FIG. 2, the power conversion unit 106 is equipped with the phase modulation circuit 140 which functions as a recovery mechanism for detecting the variable power (wattage) of the DC power output 104. Since the DC power output 104 involves a fixed voltage output, and thus the phase modulation circuit 140 is simply provided in the form of a current differentiator.

As soon as the variable power of the DC power output 104 exceeds a threshold value, the phase modulation circuit 140 sends a recovery signal SR to the mode controller 130. Preferably, the mode controller 130 comprises a non-volatile memory (not shown) for storing recovery values (the factory defaults, for example) corresponding to the circuit parameters. Upon receipt of the recovery signal SR, the operating mode of the AC/DC conversion circuit 110, the DC/DC conversion circuit 112, and the active heat dissipation module 135 are configured according to the recovery values. Hence, due to the efficiency manifested by the operating mode configured according to the recovery values, there is the optimal conversion efficiency in the presence of the rated maximum load of the power supply system 100.

The purpose of the phase modulation circuit 140 is to prevent the following phenomenon: if the power conversion unit 110 is configured for a low load from the host computer 150 and the host computer suddenly draws a high load, the conversion circuits inside the power conversion unit with instantaneously switch and cause an overload. Conversely, the phase modulation circuit 140 is not intended for the optimal conversion efficiency. The phase modulation circuit 140 is implemented by a hardware circuit and thus its response duration is short enough, preferably, but not limited to, to achieve nanosecond time scale or to be at least faster than the parameter setting controller 120. If the load increases quickly initially but fails to attain the rated maximum load ultimately, it will be practicable for the parameter setting controller 120 to optimize the conversion efficiency according to the measured load. The present invention is not limited to the aforesaid recovery mechanism but includes a recovery mechanism for adjusting the other parameters.

The foregoing preferred embodiments are provided to illustrate and disclose the technical features of the present invention, and are not intended to be restrictive of the scope of the present invention. Hence, all equivalent variations or modifications made to the foregoing embodiments without departing from the spirit embodied in the disclosure of the present invention should fall within the scope of the present invention as set forth in the appended claims.

What is claimed is:

1. A power supplying method for changing the efficiency of a power conversion unit, the method comprising:
    measuring, by a DC meter, a change in DC power of a DC power output, the change indicative of a new load being drawn from the DC power output;
    sending, by the DC meter, a power signal indicative of the change in the DC power;
    receiving, by a second controller, the power signal;
    outputting, by the second controller, a parameter setting signal to a first controller in response to the power signal;
    determining, by the first controller, a value of a circuit parameter according to the parameter setting signal; and
    adjusting, by the first controller, an operating mode of a power conversion circuit according to the value such that the power conversion unit increases in efficiency while the new load is being drawn from the DC power output.

2. The power supplying method of claim 1 further comprising:
    determining, by a recovery circuit, variable power of the DC power output;
    sending, by the recovery circuit, a recovery signal to the first controller in response to the variable power exceeding a threshold value;
    determining, by the first controller, the value of the circuit parameter according to a recovery value in response to the recovery signal; and
    adjusting, by the first controller, the operating mode of the power conversion circuit according to the determined value of the circuit parameter.

3. The power supplying method of claim 1, wherein the power conversion unit increase in efficiency is relative to the efficiency of the DC power output after the new load began being drawn but before the adjustment occurred.

4. The power supplying method of claim 1, wherein the power conversion unit includes an active heat dissipation module, and wherein the adjusting of the operating mode includes adjusting the active heat dissipation module.

5. The power supplying method of claim 1, wherein the power conversion circuit includes an AC-DC conversion circuit, wherein the adjusting of the operating mode includes adjusting operation of the AC-DC conversion circuit.

6. The power supplying method of claim 1, wherein the power conversion circuit includes an AC-DC conversion circuit and a DC-DC conversion circuit, wherein the adjusting of the operating mode includes adjusting operation of the DC-DC conversion circuit.

7. The power supplying method of claim 1, wherein the power conversion circuit includes an AC-DC conversion circuit and a DC-DC conversion circuit, wherein the adjusting of the operating mode includes adjusting operation of the AC-DC conversion circuit, and the adjusting of the operating mode further includes adjusting operation of the DC-DC conversion circuit.

8. A method for changing the efficiency of a power conversion unit of a power supply, the method comprising:
    measuring, by the power supply, a DC power draw from a DC power output indicative of a new load;
    determining, by the power supply, one or more parameter values to configure a power conversion circuit for increased efficiency at the new load;
    outputting, by the power supply and to the power conversion unit, a parameter setting signal containing the one or more parameter values;
    determining, by the power conversion unit, an updated operating mode based on the one or more parameter values of the parameter setting signal; and
    adjusting, by the power conversion unit, operation of the power conversion circuit to the updated operating mode.

9. The method of claim 8 further comprising:
    detecting, by the power conversion unit, variable power of the DC power output that exceeds the new load;
    determining, by the power conversion unit, a recovery mode based on one or more recovery parameters stored in the power conversion unit; and
    adjusting, by the power conversion unit, operation of the power conversion circuit to the recovery mode.

10. The method of claim 8, wherein the power conversion unit includes an active heat dissipation module, the method further comprising:
    determining, by the power supply, one or more variable values to configure the active heat dissipation module for increased efficiency at the new load;
    outputting, by the power supply and to the power conversion unit, a variable setting signal containing the one or more variable values;

determining, by the power conversion unit, an updated module operating mode based on the one or more variable values of the variable setting signal; and adjusting, by the power conversion unit, operation of the active heat dissipation module to the updated module operating mode.

11. The method of claim 8, wherein the power conversion circuit includes an AC-DC conversion circuit, wherein the adjusting operation of the power conversion circuit further includes adjusting operation of the AC-DC conversion circuit.

12. The method of claim 8, wherein the power conversion circuit includes an AC-DC conversion circuit and a DC-DC conversion circuit, wherein the adjusting operation of the power conversion circuit further includes adjusting operation of the DC-DC conversion circuit.

13. The method of claim 8, wherein the power conversion circuit includes an AC-DC conversion circuit and a DC-DC conversion circuit, wherein the adjusting operation of the power conversion circuit further includes adjusting operation of the AC-DC conversion circuit and further includes adjusting operation of the DC-DC conversion circuit.

14. A power supplying method for changing the efficiency of a power conversion unit, the method comprising:

operating, by a first controller, a power conversion circuit at a first operating mode, the first operating mode based on one or more stored circuit parameter values contained in the power conversion unit, the first operating mode enabling the power conversion unit to provide DC power at a first load;

detecting, by a DC meter, a decrease in DC power being drawn from the first load to a second load;

transmitting, by the DC meter and to a second controller, a first power signal indicative of the decrease in DC power to the second load;

determining, by the second controller, one or more circuit parameter values to operate the power conversion circuit at a second operating mode, the second operating mode enabling the power conversion circuit to provide increased efficiency over the first operating mode at the second load;

sending, by the second controller and to the first controller, a parameter setting that contains the one or more circuit parameter values; and adjusting, by the first controller, operation of the power conversion circuit to the second operating mode based on the one or more circuit parameter values.

15. The power supplying method of claim 14, further comprising:

determining, by a recovery circuit, an increase in DC power being drawn from the second load to a third load;

sending, by the recovery circuit, a recovery signal to the first controller in response to the determined increase in DC power;

determining, by the first controller, a third operating mode of the power conversion circuit, the third operating mode based on one or more stored recovery parameters contained in the power conversion unit, the third operating mode enables the power conversion unit to provide DC power at or above the third load; and adjusting, by the first controller, operation of the power conversion circuit to the third operating mode based on the one or more stored recovery parameters.

16. The power supplying method of claim 15, wherein the third load is equal to the first load.

17. The power supplying method of claim 14, wherein the power conversion unit includes an active heat dissipation module capable of operating at the first operating mode and the second operating mode, and wherein the second operating mode further enables the active heat dissipation module to provide increased efficiency over the first operating mode at the second load, the method comprising:

determining, by the second controller, one or more module parameter values to operate the active heat dissipation module at the second operating mode;

sending, by the second controller and to the first controller, a module parameter setting signal that contains the one or more module parameter values; and adjusting, by the first controller, operation of the active heat dissipation module to the second operating mode based on the one or more module parameter values.

18. The method of claim 14, wherein the power conversion circuit includes an AC-DC conversion circuit, wherein the adjusting operation of the power conversion circuit further includes adjusting operation of the AC-DC conversion circuit.

19. The method of claim 14, wherein the power conversion circuit includes an AC-DC conversion circuit and a DC-DC conversion circuit, wherein the adjusting operation of the power conversion circuit further includes adjusting operation of the DC-DC conversion circuit.

20. The method of claim 14, wherein the power conversion circuit includes an AC-DC conversion circuit and a DC-DC conversion circuit, wherein the adjusting operation of the power conversion circuit further includes adjusting operation of the AC-DC conversion circuit and further includes adjusting operation of the DC-DC conversion circuit.

* * * * *